US009268888B1

(12) United States Patent
Leong et al.

(10) Patent No.: US 9,268,888 B1
(45) Date of Patent: Feb. 23, 2016

(54) LATENCY COMPUTATION CIRCUITRY

(71) Applicant: Altera Corporation, San Jose, CA (US)

(72) Inventors: Han Hua Leong, Butterworth (MY); Si Xing Saw, Bukit Mertajam (MY); Seng Kuan Yeow, Pokok Sena (MY)

(73) Assignee: Altera Corporation, San Jose, CA (US)

( * ) Notice: Subject to any disclaimer, the term of this patent is extended or adjusted under 35 U.S.C. 154(b) by 304 days.

(21) Appl. No.: 13/889,033

(22) Filed: May 7, 2013

(51) Int. Cl.
*H04J 3/06* (2006.01)
*G06F 17/50* (2006.01)

(52) U.S. Cl.
CPC .................................. *G06F 17/5031* (2013.01)

(58) Field of Classification Search
USPC .................. 370/509, 510, 537, 503, 504, 520
See application file for complete search history.

(56) References Cited

U.S. PATENT DOCUMENTS

| | | | | |
|---|---|---|---|---|
| 6,751,194 | B1* | 6/2004 | Ueno ...................... | H04J 3/247 370/235 |
| 7,123,675 | B2* | 10/2006 | Boles .................... | H04J 3/0682 327/141 |
| 7,852,881 | B2* | 12/2010 | Schumann-Olsen | H04J 3/1623 370/509 |
| 8,386,828 | B1 | 2/2013 | Ambatipudi et al. | |
| 8,401,821 | B1 | 3/2013 | Sertamo | |
| 8,654,823 | B1* | 2/2014 | Zhu et al. ....................... | 375/220 |
| 9,111,042 | B1* | 8/2015 | Mendel ................. | G06F 13/358 |
| 2004/0223520 | A1* | 11/2004 | Swanson et al. .............. | 370/537 |
| 2008/0075120 | A1* | 3/2008 | Fourcand ............. | H04J 3/0602 370/503 |
| 2008/0075121 | A1* | 3/2008 | Fourcand ............. | H04J 3/0682 370/503 |
| 2008/0075122 | A1* | 3/2008 | Fourcand ............. | H04L 3/0605 370/503 |
| 2008/0075128 | A1* | 3/2008 | Fourcand ............. | H04J 3/0602 370/520 |
| 2010/0290509 | A1* | 11/2010 | Dalsgaard ........... | H04W 76/005 375/220 |
| 2010/0316069 | A1* | 12/2010 | Fourcand ............. | H04J 3/0605 370/503 |
| 2011/0280348 | A1* | 11/2011 | Li ....................... | H04L 27/0014 375/343 |
| 2012/0082156 | A1* | 4/2012 | Swartzentruber et al. .... | 370/389 |
| 2012/0311621 | A1 | 12/2012 | Foster et al. | |
| 2013/0051407 | A1* | 2/2013 | Fourcand ............. | H04J 3/0602 370/514 |
| 2013/0329585 | A1* | 12/2013 | Okada .................. | H04W 24/00 370/252 |

* cited by examiner

*Primary Examiner* — Chuong T Ho (57) ABSTRACT

An integrated circuit may include multiple circuit blocks, each with an associated latency value. As an example, transceiver circuitry in an integrated circuit may receive different data packets and circuit blocks in the transceiver circuitry may have different latency values depending on the data packets received. The integrated circuit may further include latency computation circuitry that receives the different latency values from the multiple circuit blocks. The latency computation circuitry may accordingly output a total latency value for the multiple circuit blocks in the integrated circuit based on the received latency values.

18 Claims, 5 Drawing Sheets

LATENCY COMPUTATION CIRCUITRY

BACKGROUND

Integrated circuit devices may generally be adapted to implement a wide array of functions. Programmable integrated circuit devices, for example, may include logic or circuit blocks that are configurable to implement different user designs. Accordingly, integrated circuit devices may be employed in different systems (e.g., in various communication systems). An integrated circuit device may be coupled to off-chip elements that are external to the device through various input-output protocols.

Generally, an integrated circuit device may include high-speed transceiver (transmitter and receiver) channels that may be used to communicate with external circuits through different protocols. However, different communication standards and protocols may have specific requirements met when implementing certain functions with an integrated circuit device. As an example, when used in a high-speed communication system, the integrated circuit device may transmit and receive data packets through a high-speed data transfer protocol (e.g., the Gigabit Ethernet standard).

Oftentimes proper clock synchronization may be required for different components within a communication system to communicate effectively. For instance, in the Precision Time Protocol (a protocol generally used to synchronize clocks within a system network) different messages are exchanged between devices in the system for synchronization purposes. These messages include timestamps that may be used to synchronize the data packets received by and transmitted from different devices.

In order to generate accurate timestamps for every data packet received by a particular device, the actual latency (i.e., the time needed for a packet of data to travel from one point to another) of various circuit blocks within the device may need to be considered. However, depending on the received data packets, circuits within an integrated circuit device may generally have varying latencies.

It is within this context that the embodiments described herein arise.

SUMMARY

Circuitry and techniques for computing a total latency for multiple circuit blocks in an integrated circuit are provided. It is appreciated that the present invention can be implemented in numerous ways, such as a process, an apparatus, a system, or a device. Several inventive embodiments of the present invention are described below.

An integrated circuit may include multiple circuit blocks and latency computation circuitry. Each of the circuit blocks may have its own associated latency value. Accordingly, the latency computation circuitry may receive the respective latency values from the circuit blocks to produce a total latency value that is associated with the multiple circuit blocks. In one embodiment, the latency computation circuitry may include delay measurement circuits to determine the latency value for each of the circuit blocks in the integrated circuit.

Latency calculator circuitry for calculating a total latency that is associated with multiple transceiver circuit blocks on an integrated circuit may include a delay measurement circuit coupled to at least one transceiver circuit block. The delay measurement circuit may determine a delay measurement value of that transceiver circuit block. The latency calculator circuitry may further include adder circuitry that receives the delay measurement value from the delay measurement circuit and that provides the total latency value associated with the plurality of transceiver circuit blocks. As an example, the adder circuitry may include a plurality of adder circuits that are serially coupled to form a plurality of adder stages. Each adder stage may receive a corresponding delay measurement value associated with a corresponding transceiver circuit block in the multiple transceiver circuit blocks, and an intermediate total delay value from a preceding adder stage.

A multiplexing circuit is coupled between at least one pair of consecutive adder stages in the serially-coupled adder circuits to output a current total delay value for the current adder stage. The multiplexing circuit may be coupled such that it may select either the intermediate total delay value from the preceding adder stage or an output from the current adder stage as the current total delay value.

A method of operating an integrated circuit may include receiving a data packet from an off-chip circuitry. The off-chip circuitry is external to the integrated circuit and the data packet may be received with receiver circuitry on the integrated circuit. The receiver circuitry may include a plurality of circuit blocks. Based on the received data packet, a delay value for each of the circuit blocks may be determined with delay measurement circuitry on the integrated circuit. The delay value for each of the circuit block may be summed with adder circuitry on the integrated circuit to produce a total latency value that is associated with the receiver circuitry.

DETAILED DESCRIPTION

The embodiments provided herein include circuitry and techniques to compute a total latency value based on different delays associated with multiple circuit blocks in an integrated circuit (IC).

It will be obvious to one skilled in the art that the present exemplary embodiments may be practiced without some or all of these specific details. In other instances, well-known operations have not been described in detail in order not to unnecessarily obscure the present embodiments.

Figure 1:
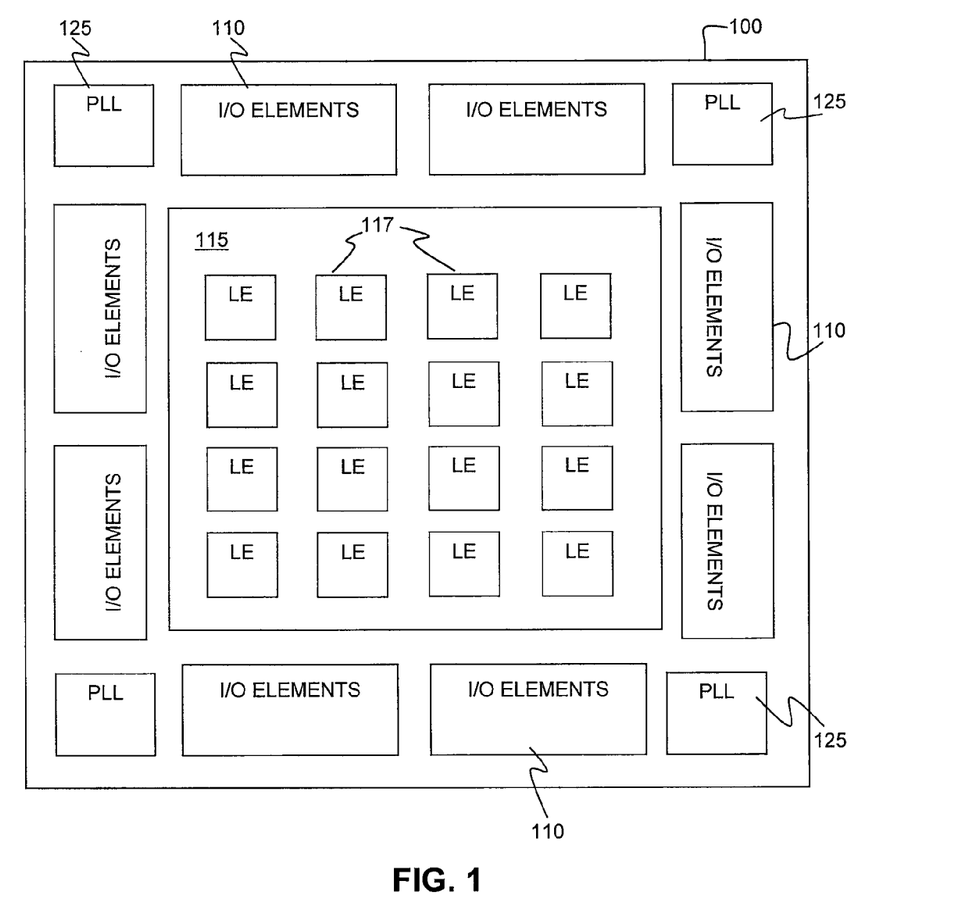
FIG. 1 is a block diagram of an illustrative integrated circuit in accordance with one embodiment of the present invention.

An IC device such as a field-programmable gate array (FPGA) device, generally includes high-speed input-output circuitry, including, among others, transceiver channels. FIG. 1, meant to be illustrative and not limiting, shows a block diagram of IC 100 that can implement embodiments of the present invention. Generally, an IC device such as IC 100 includes core logic region 115 and input-output elements 110. Other auxiliary circuits, such as phase-locked loops (PLLs) 125 for clock generation and timing, can be located outside the core logic region 115 (e.g., at corners of IC 100 and adjacent to input-output elements 110).

Core logic region 115 may be populated with logic cells that include "logic elements" (LEs) 117, among other circuits. LEs 117 may include look-up table-based logic regions and may be grouped into "Logic Array Blocks" (LABs). LEs 117 and groups of LEs or LABs can be configured to perform logical functions desired by the user. Configuration data loaded into configuration memory can be used to produce control signals that configure LEs 117 and groups of LEs and LABs to perform the desired logical functions. Signals received from external circuitry at input-output elements 110 may be routed from input-output elements 110 to core logic region 115 and other logic blocks on IC 100. Core logic region 115 and other logic blocks on IC 100 may perform functions based on the signals received.

Signals may be sent from core logic region 115 and other relevant logic blocks of IC 100 to other external circuitry or components that may be connected to IC 100 through input-output elements 110. A single device like IC 100 can potentially support a variety of different interfaces and each individual input-output bank 110 can support a different input-output standard with a different interface or protocol (e.g., high-speed serial interface protocol).

In the embodiment of FIG. 1, input-output elements 110 may include input-output buffers and high-speed transmitter/receiver circuitry that connect IC 100 to other external components. A transceiver channel may generally be divided into two blocks (both not shown in FIG. 1). As an example, a transceiver channel may include a physical coding sublayer (PCS) block and a physical medium attachment (PMA) block. The PCS block is a block that is located between the core region of the device (e.g., core region 115) and the PMA block. The PCS may include, among others, decoders, encoders, alignment circuitry, and registers such as first-in-first-out (FIFO) storage blocks. The PMA block generally connects the IC device (e.g., IC 100) to the channel, generates the required clocks, and converts data from parallel to serial (and from serial to parallel).

Accordingly, in a transceiver channel, a serializer may be included in the PMA transmitter block. The serializer may take in a parallel data word and serialize the data for transmission at a higher serial data rate. As an example, a parallel data word may be latched into the serializer by a parallel clock and shifted out of the serializer by a serial clock. The serial clock typically exhibits a higher frequency compared to the parallel clock.

Figure 2:
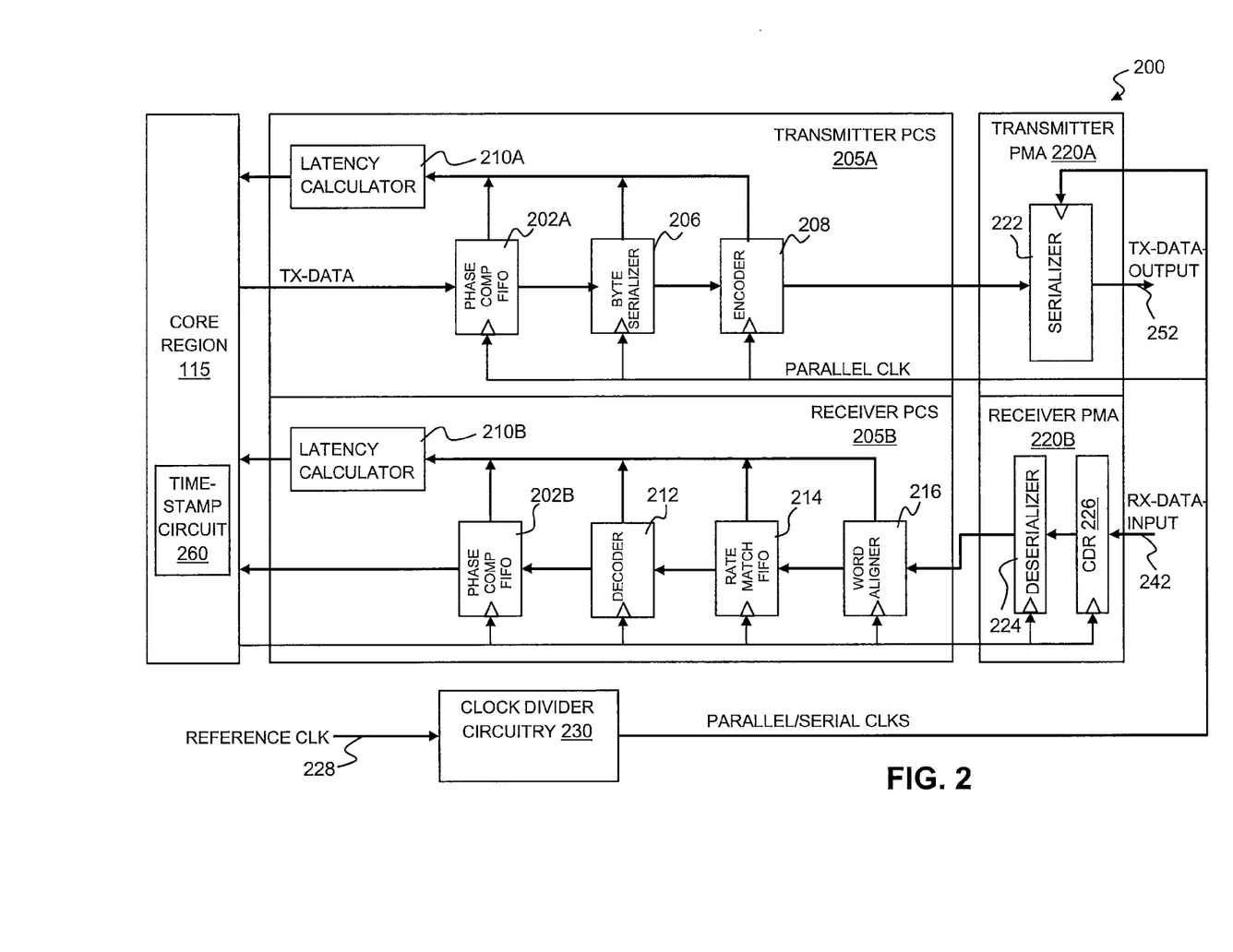
FIG. 2 shows illustrative transceiver circuitry with latency calculator circuitry in accordance with one embodiment of the present invention.

FIG. 2 shows illustrative transceiver circuitry 200 with latency calculator circuitry in accordance with one embodiment of the present invention. Transceiver circuitry 200 may include transmitter circuitry that includes transmitter PCS block 205A and PMA block 220A and receiver circuitry that includes receiver PCS block 205B and PMA block 220B. Latency calculators 210A and 210B may be included, respectively, in transmitter PCS block 205A and receiver PCS block 205B to calculate the latencies of different circuit blocks within the two PCS blocks. In general, the time needed for a packet of data to travel from one point to another or from one circuit block to another may be affected by various factors. Accordingly, latency calculators 210A and 210B may calculate the actual latency for a particular circuit block within respective PCS blocks 205A and 205B based on data packets that travel through them at a given time.

As an example, different circuit blocks within transmitter PMA block 220A and transmitter PCS block 205A may receive clock signals from clock divider circuitry 230. In the embodiment of FIG. 2, clock divider circuitry 230 may receive a reference clock signal such as REFERENCE CLK 228 from a phase-locked loop circuit (not shown). The reference clock signal, REFERENCE CLK 228, may then be divided by clock divider circuitry 230 to produce parallel and serial clock signals, PARALLEL/SERIAL CLKS. Accordingly, circuit blocks within the transmitter circuitry may be clocked by the parallel or serial clock signal from clock divider circuitry 230. For instance, serializer 222 in transmitter PMA block 220A may receive both the parallel and serial clock signals, PARALLEL/SERIAL CLKS, from clock divider circuitry 230 while circuit blocks within transmitter PCS block 205A such as phase compensation FIFO 202A, byte serializer circuit 206 and encoder circuit 208 may be clocked by the parallel clock signal, PARALLEL CLK, from clock divider circuitry 230.

In one embodiment, transceiver circuitry 200 may be input-output circuitry on an IC device such as IC 100 of FIG. 1. Accordingly, as shown in FIG. 2, transmitter circuitry (or more specifically, transmitter PCS block 205A) may transmit signals or data packets from core region 115 to external elements that may be coupled to the IC device through transmitter PMA block 220A. Therefore, TX-DATA-OUTPUT 252 may be an outgoing data packet that is transmitted from the IC device to external circuitry. As an example, when the IC device is transmitting a data packet, the data packet, TX-DATA, may travel from core region 115 to transmitter PCS block 205A. Different circuit blocks (some of which are shown in the embodiment of FIG. 2) in transmitter PCS block 205A may have varying latency values depending on the data packet being transmitted.

As shown in FIG. 2, transmitter PCS block 205A may include phase compensation FIFO 202A, byte serializer 206 and encoder circuit 208. Each of the blocks may be coupled to latency calculator circuitry 210A in transmitter PCS block 205A. Accordingly, the latency values of the logic blocks within transmitter PCS block 205A may then be calculated by latency calculator circuitry 210A as the outgoing data packet travels through transmitter PCS block 205A.

For instance, the data packet, TX-DATA, may first be received by phase compensation FIFO 202A that interfaces with core region 115 (or more specifically, the protocol interface within core region 115). Phase compensation FIFO 202A may compensate for the phase difference between a low-speed parallel clock signal from clock divider circuitry 230 and a clock signal that it receives from core region 115 (not shown). In one embodiment, phase compensation FIFO 202A may be set to different modes and may have different latency values depending on the mode that it is set to. In one mode, rate compensation FIFO 202A may have a fixed latency value while in another mode it may have varied latency values depending on the position of its read and write pointers. Accordingly, latency calculator 210A may calculate the actual latency of phase compensation FIFO 202A based on its operating mode.

The data packet may then be transmitted from phase compensation FIFO 202A to byte serializer circuit 206. Byte serializer circuit 206, when enabled, may allow the transmitter circuitry to run at higher data rates compared to core region 115. Data from core region 115, such as TX-DATA, may be serialized by byte serializer circuit 206 before being transmitted to other circuit blocks within transmitter PCS 205A. In one embodiment, byte serializer circuit 206 may have a fixed latency value when it is enabled (e.g., when it is in use in a user design). Accordingly, the latency of byte serializer circuit 206 may be added to the total latency value in latency calculator circuitry 210A when byte serializer circuit 206 is enabled.

As certain protocols may require the outgoing data to be encoded, encoder circuit 208 in transmitter PCS block 205A may be used to encode the outgoing data. In one embodiment, encoder circuit 208 may be an 8 B/10 B encoder that generates 10-bit code groups from 8-bit data. It should be appreciated that specific encoding operations are not described in detail herein in order to not unnecessarily obscure the present invention. The delay of encoder circuit 208 may be calculated by latency calculator 210A and added to the total delay or latency of transmitter PCS block 205A.

Latency calculator 210A may then output the total latency to core region 115. In one embodiment, the total latency calculated by latency calculator 210A may be used by time stamp generation circuitry 260 in core region 115 to generate a timestamp for the data packet TX-DATA that is being transmitted by the IC device. For instance, the data packet TX-DATA may be transmitted from transmitter PCS block 205A to transmitter PMA block 220A before being serialized and transmitted externally as TX-DATA-OUTPUT 252 by serializer 222.

On the receiver circuitry side, RX-DATA-INPUT 242 may be a data packet received from an external element that is coupled to the IC device. When the IC device receives a data packet such as RX-DATA-INPUT 242 at the input of receiver PMA 220B, the received data packet is first processed in receiver PMA block 220B. For instance, the data packet may contain serial data that needs to be deserialized (or converted to parallel data) before being transmitted to receiver PCS block 205A.

A typical receiver PMA block may include clock and data recovery (CDR) circuitry and a deserializer circuit such as CDR 226 and deserializer circuit 224, respectively. In a receiver circuit, CDR circuitry such as CDR 226 may generally include, among others, a phase frequency detector and voltage control oscillator, and is typically used to lock the received data (with its accompanying clock signal) to a reference clock signal. As an example, CDR 226 may operate in a lock-to-reference (LTR) mode in order to lock to a reference clock signal and be trained to a configured data rate. After that, CDR 226 may switch to a lock-to-data (LTD) mode to recover the accompanying clock signal from the incoming data. Subsequently, the received serial data may be converted to parallel data by deserializer circuit 224. It should be appreciated that specific details of deserializer circuit 224 and CDR 226 have been purposefully left out in order to not unnecessarily obscure the present invention.

The deserialized data may then be transmitted to various circuit blocks within receiver PCS block 205B. In the embodiment of FIG. 2, receiver PCS block 205B may include word aligner circuit 216, rate match FIFO 214, decoder circuit 212, phase compensation FIFO 202B and latency calculator circuitry 210B. As the received data is deserialized at receiver PMA 220B, the data may lose the word boundary of its upstream transmitter (i.e., external circuitry that may be coupled to the IC device and transmitting the data packet to the IC device) after the deserialization. Word aligner circuit 216 may thus be used to restore the word boundary of the parallel data it receives from deserializer circuit 224 based on a pre-defined alignment pattern (e.g., a typical protocol such as the PCIe may specify a standard word alignment pattern that a word aligner such as word aligner circuit 216 uses). Word aligner circuit 216 may have different latencies based on the data packet it receives (or more specifically, based on the word aligner boundary of a particular data packet it receives). The actual latency of word aligner circuit 216 may accordingly be determined by latency calculator 210B based on the incoming data packet.

Rate match FIFO 214 may be used to compensate for clock frequency differences between the IC device and the upstream transmitter (not shown) that is coupled to receiver PMA 220B. In one embodiment, the latency of rate match FIFO 214 may depend on the position of its read and write pointers and the status of its insert and delete flags. Latency calculator 210B may accordingly calculate the actual latency of rate match FIFO 214 based on all these different factors (or at least some them).

As certain protocols may require serial data to be encoded, decoder circuit 212 in receiver PCS block 205B may be needed to decode the received data before forwarding the data to the upper layers of the receiver circuitry for packet processing. In the embodiment of FIG. 2, decoder circuit 212 is placed after rate match FIFO 214. Therefore, when rate match FIFO 214 is enabled, decoder circuit 212 may receive data from rate match FIFO 214. Alternatively, when rate match FIFO 214 is disabled, decoder circuit 212 may receive the data directly from word aligner 216. The delay, if any, of decoder circuit 212 may then be calculated by latency calculator 210B.

The decoded data may subsequently be transmitted from decoder circuit 212 to phase compensation FIFO 202B. In general, the rate compensation FIFO in each transceiver channel may ensure the reliable transfer of data and status signals between the receiver channel, such as receiver PCS 205B and receiver PMA 220B, and the core region 115 of the IC device. Rate compensation FIFO 202B may compensate for the phase difference between its read and write clocks (shown as a single clock input in FIG. 2). As mentioned before, a rate compensation FIFO such as rate compensation FIFO 202B (or rate compensation FIFO 202A) may be set to different modes. Accordingly, in one embodiment, latency calculator 210B may calculate the actual latency of rate compensation FIFO 202B based on its operating mode.

The output of latency calculator 210B may be the total latency value of the receiver circuit (or more specifically, receiver PCS 205B) based on a particular data packet received (the details of which will be explained with reference to FIG. 3B). In one embodiment the output of latency calculator 210B may be used by logic blocks in core region 115 to generate a timestamp for the received data packet. As shown in FIG. 2, logic blocks in core region 115 may form timestamp generation circuitry 260 that may be used to generate timestamps for received data packets (or for data packets being transmitted by the IC device). Such timestamps may be needed for proper synchronization of data packets that are received or transmitted by the IC device.

Figure 3A:
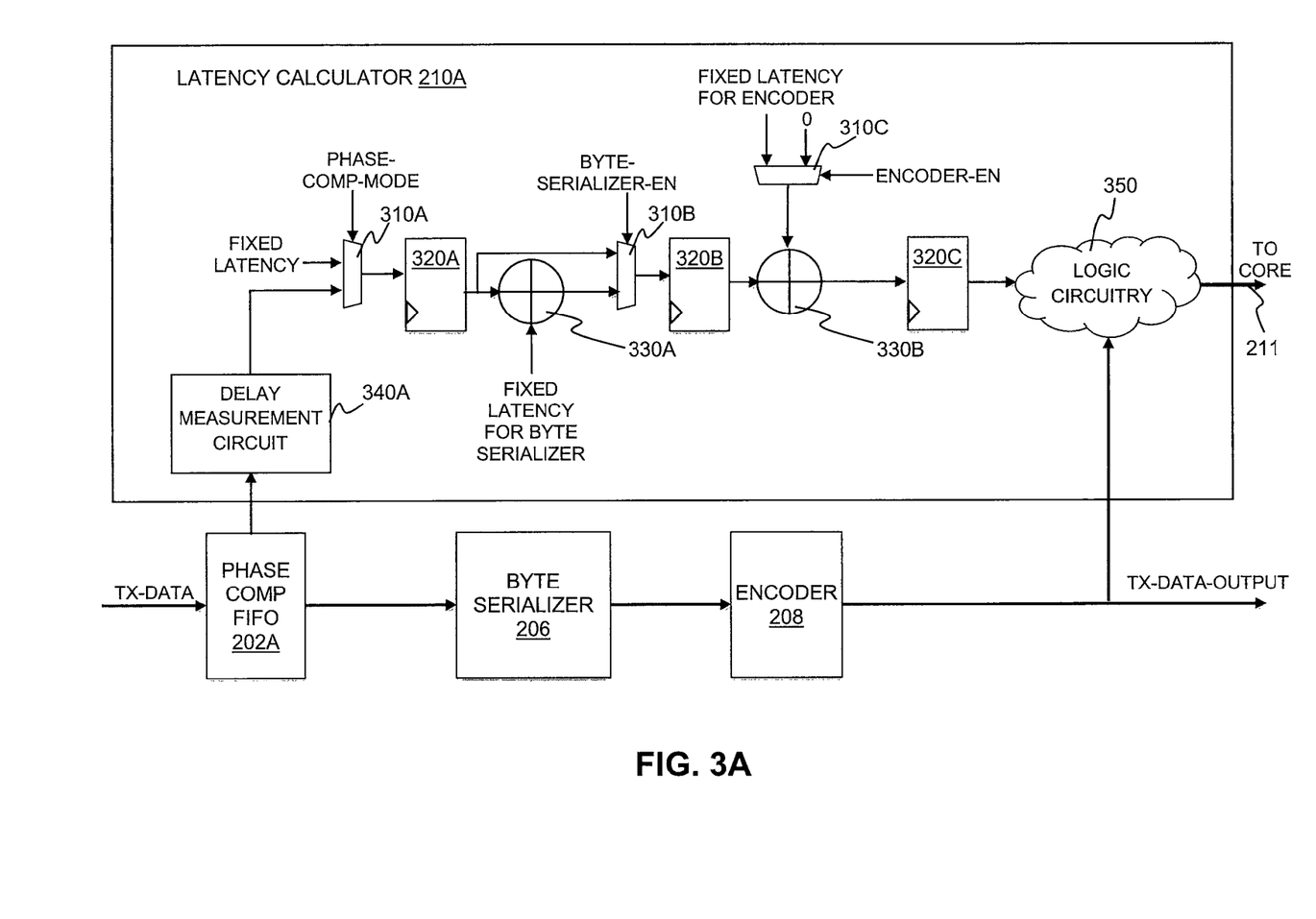
FIG. 3A shows a more detailed representation of illustrative latency calculator circuitry in a transmitter circuit in accordance with one embodiment of the present invention.

FIG. 3A shows a more detailed representation of illustrative latency calculator circuitry 210A in accordance with one embodiment of the present invention. It should be appreciated that FIG. 3A shares similarities with FIG. 2 and as such, for the sake of brevity, elements that have been described earlier (phase compensation FIFO 202A, byte serializer circuit 206 and encoder circuit 208) are not described in detail again. Latency calculator circuitry 210A may include a delay measurement circuit (e.g., delay measurement circuit 340A) that is coupled to at least one logic block in a transmitter circuit such as transmitter PCS block 205A of FIG. 2 (e.g., delay measurement circuit 340A is coupled to phase compensation FIFO 202A).

Adder circuits such as adder circuits 330A and 330B in latency calculator circuitry 210A may be used to sum the latency values from the different logic blocks in the transmitter circuit to produce a total latency value at output 211. In one embodiment, these adder circuits may be coupled in series to form multiple adder stages. For instance, an adder stage may correspond to a logic block in the transmitter circuit (for instance, byte serializer 206 or encoder circuit 208). In one embodiment, each adder stage may receive either a calculated latency value (or a fixed latency value) or a zero value depending on the configuration of a particular logic block.

As different logic blocks or circuits may have different latency values depending on the data packet being transmitted, delay measurement circuits such as delay measurement circuit 340A may be used to measure the actual delay of specific logic blocks in the transmitter circuit. As an example, delay measurement circuit 340A is coupled to phase compensation FIFO 202A.

As mentioned, a phase compensation FIFO may operate in different modes. For instance, when operating in one mode (e.g., register mode), phase compensation FIFO 202A may have a fixed latency (e.g., the phase compensation FIFO may be delayed by one clock cycle). When operating in another mode (e.g., low latency mode), the latency of phase compensation FIFO 202A may depend on the position of its read and write pointers. Accordingly, multiplexing circuit 310A may be configured to output either a fixed latency value or a latency value that is calculated based on positions of the read and write pointers in phase compensation FIFO 202A. In one embodiment, the PHASE-COMP-MODE signal may be set based on the operating mode of phase compensation FIFO 202A so that multiplexing circuit 310A may output an appropriate latency value.

As an example, when phase compensation FIFO 202A is full, a full signal may be asserted and transmission of data to the FIFO (for instance, writing to the FIFO) is halted. More clock cycles may thus be needed to write data to phase compensation FIFO 202A as data needs to be unloaded from the FIFO for the full signal to be deasserted before new data can be written to it. Delay measurement circuit 340A may thus calculate the actual latency of phase compensation FIFO 202A and the actual latency may then be transmitted to storage element 320A based on the operating mode of phase compensation FIFO 202A.

In the embodiment of FIG. 3A, byte serializer circuit 206 is coupled to phase compensation FIFO 202A. Byte serializer circuit 206 may have a fixed latency value when it is enabled (e.g., when it is in use in a user design). Accordingly, the fixed latency value from byte serializer circuit 206 may then be added to the latency value of phase compensation FIFO when byte serializer circuit 206 is enabled in a user design. Adder circuit 330A is used to sum the respective latency values of phase compensation FIFO 202A and byte serializer 206.

As shown in FIG. 3A, multiplexing circuit 310B, depending on its select input BYTE-SERIALIZER-EN, may selectively output either the direct output from storage element 320A (that is, the latency value of phase compensation FIFO 202A) or the sum of the latency values of both phase compensation FIFO 202A and byte serializer circuit 206. For instance, BYTE-SERIALIZER-EN may be set to a logic low level when byte serializer circuit 206 is disabled so that multiplexing circuit 310B may output just the latency value of phase compensation FIFO 202A. The total latency value at this stage may be captured by storage element 320B.

In one embodiment, encoder circuit 208 may have a fixed latency value. Accordingly, when encoder circuit 208 is enabled, adder circuit 330B may add the total latency value stored in storage element 320B to the fixed latency value of encoder circuit 208. In the embodiment of FIG. 3A, multiplexing circuit 310C may supply either the predetermined fixed latency value when encoder circuit 208 is enabled (or a zero value when encoder circuit 208 is disabled) as an input to adder circuit 330B. The signal, ENCODER-EN, may be set accordingly based on the status of encoder circuit 208. The total latency value of the transmitter circuit may subsequently be captured by storage element 320C.

Logic circuitry 350 may be used to control the output (i.e., the total latency calculated) of latency calculator 210A. In one embodiment, logic circuitry 350 may output the total latency value after a valid latency value is obtained. The total latency value may be transmitted from latency calculator 210A to the core region of the IC device via output 211. It should be appreciated that even though specific logic blocks such as phase compensation FIFO 202A, byte serializer circuit 206 and encoder circuit 208 are shown in FIGS. 2 and 3A, certain logic blocks may be omitted and other logic blocks may be included in a transmitter circuit. Accordingly, fewer or more adder circuits such as adder circuits 330A and 330B may be serially coupled and different delay measurement circuits may be used, if so desired, to calculate the actual delay of specific logic blocks.

Figure 3B:
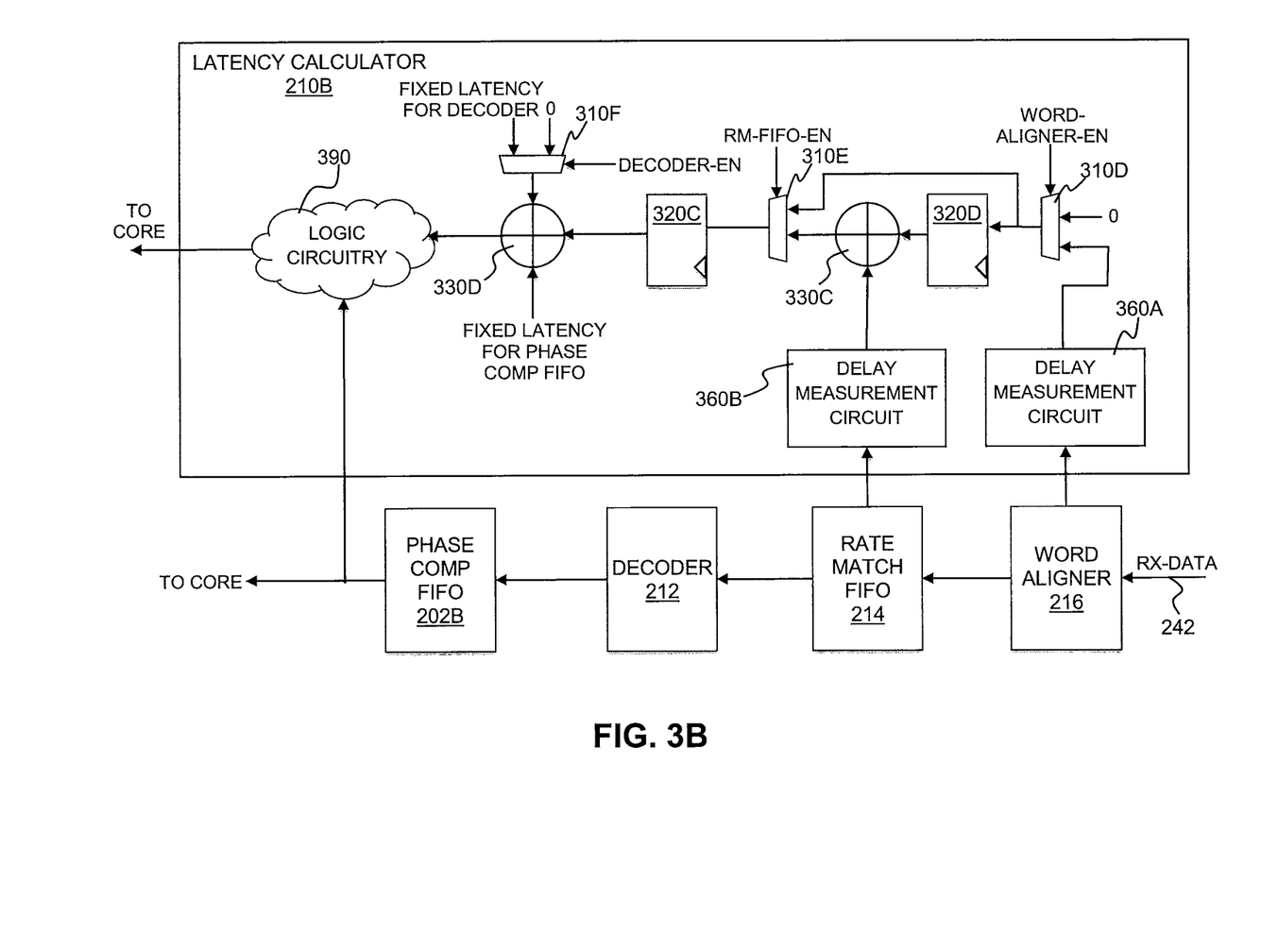
FIG. 3B shows a more detailed representation of illustrative latency calculator circuitry in a receiver circuit in accordance with one embodiment of the present invention.

FIG. 3B shows a more detailed representation of illustrative latency calculator circuitry 210B in a receiver circuit (such as receiver PCS block 205B of FIG. 2) in accordance with one embodiment of the present invention. Latency calculator circuitry 210B includes multiplexing circuits 310D-310F, two serially-coupled adder circuits 330C and 330D and delay measurement circuits 360A and 360B. As a data packet, such as RX-DATA 242, is received, the delay of word aligner circuit 216 may be determined by delay measurement circuit 360A.

In one embodiment, delay measurement circuit 360A may calculate the actual delay or latency of word aligner circuit 216 based on the received data packet, RX-DATA 242. In general, most applications or protocols may organize data into bytes or words (that is, groups of bytes). For 8 B/10 B encoded applications, data may be organized into 10-bit encoded symbols and the received data may not match the byte or symbol boundaries of the protocol. Depending on the word boundary of a particular data word, word aligner circuit 216 may have a different latency value. For instance, if the word boundary is at bit 0 in a 10-bit word, and word aligner circuit 216 needed a total of four clock cycles to restore the word boundary, then the number of clock cycles needed to restore the word boundary is four clock cycles (since every 10-bit word read would form a complete word set). If the word boundary occurs at the fourth bit of the 10-bit word, an additional clock cycle may be needed to restore the word boundary (because every 10-bit word read does not form a complete word set). That is to say, in the first read, word aligner circuit 216 may obtain bits four to seven of the 10-bit word and an additional read cycle is needed to obtain the last three bits (i.e., bits eight to ten) of the 10-bit word. Therefore, in one embodiment, delay measurement circuit 360A may determine the actual delay of word aligner circuit 216 based on the received data, RX-DATA 242.

The actual latency value of word aligner circuit 216 is transmitted from delay measurement circuit 360A to multiplexing circuit 310D. If word aligner circuit 216 is enabled (i.e., used in a particular user design), multiplexing circuit 310D may output the actual latency value of word aligner circuit 216 that is obtained from delay measurement circuit 360A. Alternatively, multiplexing circuit 310D may selectively output a zero when word aligner circuit 216 is disabled. In one embodiment, the control signal WORD-ALIGNER-EN at the select input of multiplexing circuit 310D is set to different logic levels based on whether word aligner circuit 216 is enabled or disabled at a given time. The latency value at this stage may be stored in storage element 320D.

Accordingly, delay measurement circuit 360B may be coupled to rate match FIFO 214 to determine the actual delay incurred by rate match FIFO 214 depending on the incoming data packet, RX-DATA 242. In one embodiment, delay measurement circuit 360B may include logic circuitry that calculates the delay or number of clock cycles incurred by rate match FIFO 214 based on the position of its read and write pointers (or the status of its insert and delete flags). Adder circuit 330C may sum the previous latency value stored in storage element 320D and the latency value of rate match FIFO 214. Multiplexing circuit 310E may selectively output the sum of the two latency values or just the latency value of word aligner circuit 216, depending on whether or not rate match FIFO 214 is enabled. The control signal RM-FIFO-EN coupled to the select input of multiplexing circuit 310E may accordingly be set based on the status of rate match FIFO 214. The total latency value at this stage may be transmitted from multiplexing circuit 310E to storage element 320C.

The total latency value that has been determined thus far (the intermediate total latency value) may be transmitted from storage element 320C to adder circuit 330D. In the embodiment of FIG. 3B, adder circuit 330D may add the latency value of decoder circuit 212 (if any) and the latency value of phase compensation FIFO 202B to the intermediate total latency value. In this example, decoder circuit 212, when enabled, may have a fixed latency value.

Accordingly, multiplexing circuit 310F may selectively output either a zero (when decoder circuit 212 is disabled) or a predetermined fixed latency value (when decoder circuit 212 is enabled). As shown in FIG. 3B, control signal DECODER-EN may be set accordingly such that multiplexing circuit 310F may output an appropriate latency value based on the status of decoder circuit 212. In certain scenarios, phase compensation FIFO 202B may generally have a fixed latency value. As such, in one embodiment, a fixed latency value is provided to adder circuit 330D as the latency value of phase compensation FIFO 202B. It should be appreciated that a delay measurement circuit may be used to determine the actual latency of phase compensation FIFO 202B based on the positions of its pointers, if so desired.

The output of adder circuit 330D (the total latency value), may be transmitted to logic circuitry 390. Logic circuitry 390 may generate a ready signal when the total latency value of the receiver circuit has been calculated. In one embodiment, logic circuitry 390 may transmit the ready signal together with the total latency value to the core region of the device such as core region 115 of FIGS. 1 and 2.

Figure 4:
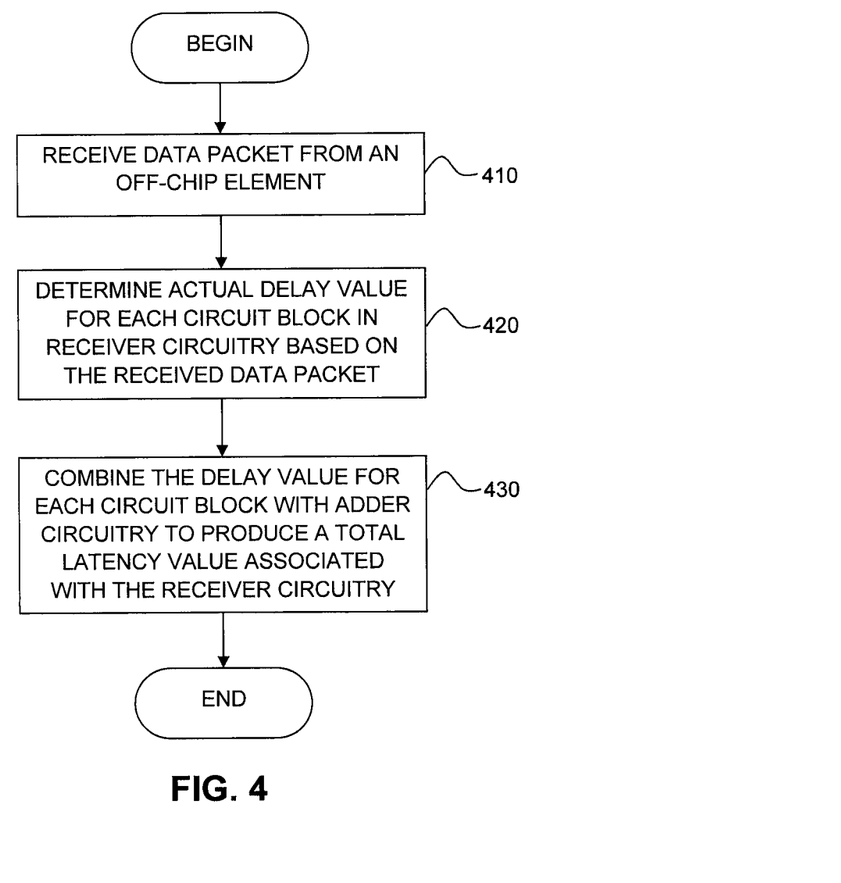
FIG. 4 shows illustrative steps for operating an integrated circuit in accordance with one embodiment of the present invention.

FIG. 4 shows illustrative steps for operating an integrated circuit in accordance with one embodiment of the present invention. At step 410, a data packet is received from off-chip circuitry that is external to the integrated circuit (e.g., another integrated circuit, etc.). The data packet may be received with receiver circuitry, such as receiver PMA block 220B of FIG. 2, on the integrated circuit. In one embodiment, the receiver circuitry may include numerous circuit blocks such as those shown in receiver PCS block 205B of FIG. 2. At step 420, delay measurement circuitry on the integrated circuit may determine the actual delay value for each circuit block in the receiver circuitry based on the received data packet. As an example, as shown in FIG. 3B, delay measurement circuits 360A and 360B determines the actual delay values of word aligner circuit 216 and rate match FIFO 214, respectively. At step 430, the delay value for each circuit block may be combined by adder circuitry on the integrated circuit (such adder circuitry may be similar to adder circuit 330C and 330D of FIG. 3B) to produce a total latency value associated with the receiver circuitry. A timestamp may be generated by the integrated circuit for the received data packet based on the total latency value produced by the adder circuitry.

The embodiments, thus far, were described with respect to programmable logic circuits. The method and apparatus described herein may be incorporated into any suitable circuit. For example, the method and apparatus may also be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The foregoing is merely illustrative of the principles of this invention and various modifications can be made by those skilled in the art without departing from the scope and spirit of the invention.

What is claimed is:

1. An integrated circuit comprising:
    a plurality of circuit blocks, wherein each circuit block in the plurality of circuit blocks exhibits a respective latency value;
    latency computation circuitry that includes a delay measurement circuit that is coupled to at least one circuit block of the plurality of circuit blocks and that measures the latency value of the at least one circuit block, wherein the latency computation circuitry outputs a total latency value for a portion of the plurality of circuit blocks based on the latency value measured by the delay measurement circuit; and timestamp generation circuitry that receives the total latency value from the latency computation circuitry and generates a timestamp according to the total latency value for each data packet that the plurality of circuit blocks receives and transmits.

2. The integrated circuit defined in claim 1, wherein the latency computation circuitry comprises:

an additional delay measurement circuit coupled to the portion of the plurality of circuit blocks, wherein the additional delay measurement circuit determines the latency value of a another circuit block in the portion of the plurality of circuit blocks; and adder circuitry that receives a latency value from a selected one of the delay measurement circuit and the additional delay measurement circuit, wherein the adder circuitry provides the total latency value.

3. The integrated circuit defined in claim 2, wherein the adder circuitry further comprises:

a plurality of adder circuits coupled in series, wherein a final stage adder circuit in the serially-coupled plurality of adder circuits produces the total latency value, wherein each adder circuit in the plurality of adder circuits receives an intermediate total latency from a preceding stage adder circuit and the corresponding latency value from the selected delay measurement circuit; and a multiplexing circuit interposed in the plurality of serially-coupled plurality of adder circuits, wherein the multiplexing circuit outputs a current total latency that is selected from one of the intermediate total latency from the preceding stage adder circuit and an output from a current stage adder circuit in the plurality of serially-coupled plurality of adder circuits.

4. The integrated circuit defined in claim 1, wherein the plurality of circuit blocks comprises a plurality of transceiver circuit blocks on the integrated circuit.

5. The integrated circuit defined in claim 1, wherein the latency computation circuitry comprises:

logic circuitry that generates an asserted ready signal, wherein the timestamp generation circuitry receives the asserted ready signal and generates the timestamp in response to the assertion of the ready signal.

6. Latency calculator circuitry for calculating a total latency associated with a plurality of transceiver circuit blocks on an integrated circuit, comprising:

a delay measurement circuit coupled to at least one transceiver circuit block in the plurality of transceiver circuit blocks, wherein the delay measurement circuit determines a delay measurement value of the at least one transceiver circuit block; and adder circuitry that receives the delay measurement value and that computes the total latency associated with the plurality of transceiver circuit blocks, wherein the integrated circuit receives data packets from an external element, and wherein the integrated circuit generates a timestamp for each of the received data packets based on the total latency of the plurality of transceiver circuit blocks.

7. The latency calculator circuitry defined in claim 6, wherein the adder circuitry comprises:

a plurality of adder stages coupled in series, wherein each adder stage in the plurality of adder stages receives a corresponding delay measurement value associated with a corresponding transceiver circuit block in the plurality of transceiver circuit blocks and an intermediate total delay value from a preceding adder stage in the plurality of adder stages; and a multiplexing circuit coupled between at least one pair of consecutive adder stages in the plurality of adder stages, wherein the multiplexing circuit outputs a current total delay value that is selected from one of the intermediate total delay value from the preceding adder stage and an output from a current adder stage in the plurality of adder stages.

8. The latency calculator circuitry defined in claim 7, wherein the multiplexing circuit selectively outputs the intermediate total delay value from the preceding adder stage as the current total delay value when the corresponding circuit block coupled to the current adder stage is disabled.

9. The latency calculator circuitry defined in claim 6, wherein the at least one transceiver circuit block in the plurality of transceiver circuit blocks comprises a word aligner circuit, wherein the delay measurement circuit is coupled to the word aligner circuit, and wherein the delay measurement value of the at least one transceiver circuit block is determined based on a word alignment boundary of a data word received by the word aligner circuit.

10. The latency calculator circuitry defined in claim 6, wherein the at least one transceiver circuit block in the plurality of transceiver circuit blocks comprises a rate match first-in-first-out (FIFO) circuit, wherein the delay measurement circuit is coupled to the rate match FIFO circuit, and wherein the delay measurement value of the at least one transceiver circuit block is determined based on at least a status of a pointer in the rate match FIFO circuit.

11. The latency calculator circuitry defined in claim 6 further comprising:

logic circuitry that generates an asserted ready signal when the total latency of the plurality of transceiver circuit blocks has been calculated.

12. The latency calculator circuitry defined in claim 6, wherein the integrated circuit comprises a field programmable gate array (FPGA).

13. A method of operating an integrated circuit:

receiving a data packet from off-chip circuitry that is external to the integrated circuit with receiver circuitry on the integrated circuit, wherein the receiver circuitry includes a plurality of circuit blocks;

with delay measurement circuitry on the integrated circuit, determining an actual delay value for each circuit block in the plurality of circuit blocks based on the received data packet;

with adder circuitry on the integrated circuit, combining the respective actual delay values for each circuit block in the plurality of circuit blocks to produce a total latency value associated with the receiver circuitry; and generating a timestamp for the received data packet according to the total latency value associated with the receiver circuitry.

14. The method defined in claim 13 further comprising:

with logic circuitry, asserting a ready signal when the total latency value associated with the receiver circuitry is produced, wherein the timestamp is generated based on the total latency value in response to the assertion of the ready signal.

15. The method defined in claim 13, wherein the integrated circuit further includes transmitter circuitry having an additional plurality of circuit blocks, the method further comprising:

with additional delay measurement circuitry, determining a delay value of each circuit block in the additional plurality of circuit blocks based on a data packet to be transmitted from the integrated circuit to the off-chip circuitry to produce an additional plurality of corresponding delay values; and with additional adder circuitry, summing the additional plurality of corresponding delay values to obtain a total latency value associated with the transmitter circuitry.

16. The method defined in claim 15 further comprising:

generating an additional timestamp for the data packet to be transmitted according to the total latency value associated with the transmitter circuitry; and with the transmitter circuitry, transmitting the data packet with the generated additional timestamp.

17. The method defined in claim 16 further comprising:

with logic circuitry, asserting a ready signal when the total latency value associated with the transmitter circuitry is produced, wherein the additional timestamp for the data packet to be transmitted is generated based on the total latency value of the transmitter circuitry in response to the assertion of the another ready signal.

18. The method defined in claim 13, wherein the receiver circuitry comprises a word aligner circuit configured to align data words in the received data packet, wherein the plurality of delay values includes a delay value associated with the word aligner circuit, and wherein determining the delay value of each circuit block in the receiver circuitry comprises:

with the delay measurement circuitry, identifying a word boundary for each of the data words received by the aligner circuit; and with the delay measurement circuitry, producing the delay value associated with the word aligner circuit based on the identified word boundary.

\* \* \* \* \*